United States Patent [19]

Takahashi et al.

[11] Patent Number: 4,888,514

[45] Date of Patent: Dec. 19, 1989

[54] DRIVING APPARATUS FOR ULTRASONIC MOTOR

[75] Inventors: Ken-ichiroh Takahashi, Katano; Ritsuo Inaba, Neyagawa; Nobukazu Sugano, Suita; Noriyuki Harao, Ikoma; Yukihiro Matsuyama, Hirakata; Hiromi Tanoue, Kadoma; Toru Kishi, Yamatokouriyama, all of Japan

[73] Assignee: Matsushita Electric Industrial Co., Ltd., Kadoma, Japan

[21] Appl. No.: 260,505

[22] Filed: Oct. 13, 1988

[30] Foreign Application Priority Data

Oct. 16, 1987 [JP] Japan ............... 62-262115
Oct. 16, 1987 [JP] Japan ............... 62-262116

[51] Int. Cl.4 .................................. H01L 41/08
[52] U.S. Cl. .......................... 310/316; 310/323
[58] Field of Search ............ 310/316, 317, 323, 328; 318/116, 118

[56] References Cited

U.S. PATENT DOCUMENTS 4,658,172  4/1987  Izukawa ............... 310/323
4,692,649  9/1987  Izukawa et al. ........ 310/323
4,727,276  2/1988  Izukawa et al. ........ 310/323 X
4,749,896  6/1988  Suzuki et al. ......... 310/323 X

FOREIGN PATENT DOCUMENTS 60-170472   9/1985  Japan .
60-170473   9/1985  Japan .
61-221584  10/1986  Japan .
61-221585  10/1986  Japan .
63-140678   6/1988  Japan .

OTHER PUBLICATIONS

Atsudenzaikagaku No Kiso (Fundamental Science of Piezoelectric Materials) by Takura Ikeda, issued by OHM Sha Japan.

Primary Examiner—Mark O. Budd
Attorney, Agent, or Firm—Cushman, Darby & Cushman

[57] ABSTRACT

In a driving apparatus for ultrasonic motor, a variable oscillator (44) varies oscillating frequency responding to current level of detected current which flows to a piezoelectric member (1, 2) and is in proportion to mechanical vibration of the piezoelectric member (1, 2) when mechanical resonance frequency varies by change of environmental condition.

9 Claims, 14 Drawing Sheets

DRIVING APPARATUS FOR ULTRASONIC MOTOR

FIELD OF THE INVENTION AND RELATED ART STATEMENT

1. Field of the Invention

This invention relates to an ultrasonic motor which generates driving force by using piezoelectric members, and more particularly to a driving apparatus which is used to drive piezoelectric members for exciting an elastic member of the ultrasonic motor.

2. Description of the Related Art

In recent years, an ultrasonic motor has attracted considerable attention owing to the fact that the ultrasonic motor has higher energy density (output per unit volume) than the ordinary electric motor. The ultrasonic motor makes rotation movement by generating ultrasonic vibration which is excited in an electromechanical conversion element such as a piezoelectric ceramic.

FIG. 6 shows a general structure of the conventional ultrasonic motor. In FIG. 6, the ultrasonic motor comprises a stator 4, a rotor 14, a bearing 9, a spring 10 and a nut 11. The stator 4 comprises disk-shaped piezoelectric members 1, 2 and a disk-shaped elastic member 3. The piezoelectric members 1, 2 and the elastic member 3 are stacked up each other in the axial direction of the ultrasonic motor. The rotor 14 comprises a rotor disk 5, which has a shaft 7 with a screw thread formed on one end thereof and an output shaft 8 for transmitting rotation to an object part (not shown) to be rotated, and a lining member 6 which is bonded to a bottom surface of the rotor disk 5 to frictionally touch the stator 4. The spring 10 and the nut 11 are provided in order to assemble the rotor 14 and the stator 4 with predetermined torque by screwing the nut 11 on the thread of the shaft 7. A circular protrusion 3a is provided on the elastic member 3 of the stator 4 for embodying the vibration, and the rotating force can be obtained by impressing electric signals of mutually different phase on the piezoelectric members 1 and 2.

FIG. 7 shows a driving circuit 22 of a driving apparatus for the ultrasonic motor. An oscillator 15 oscillates with a driving frequency $f_m$ inherent in the stator 4. The driving circuit 22 comprises a phase shifter 17 and amplifiers 16 and 18. Output signal of the oscillator 15 is inputted directly to the amplifier 16 and also is inputted to the amplifier 18 through the phase shifter 17. The phase shifter 17 outputs a phase-shifted signal which is shifted within a range from $+10°$ to $+170°$ (for normal direction drive) and from $-10°$ to $-170°$ (for reverse direction drive). Output signal from the amplifier 16 is impressed on a first piezoelectric member 1 through lead wires 19 and 20. And thereby, excitation wave is produced in the stator 4. The first piezoelectric member 1 has eight poles of piezoelectric transducers 13 (FIG. 6) and forms four pairs of polarized piezoelectric transducers 13. Each pair consists of neighboring two piezoelectric transducers 13 whose polarization directions are opposite to each other, and a region of each pair corresponds to one wavelength. Accordingly, the excitation wave carries four wavelengths in a circumferential direction of the first piezoelectric member 1. To a second piezoelectric member 2, the output signal from the amplifier 18 is impressed through lead wires 20 and 21. Thus, the second piezoelectric member 2 is also driven in the same manner as the first piezoelectric member 1.

When the stator 4 is driven as above-mentioned, crests (loops) of vibration (maximum displacement points) of the stator 4 at the part facing the rotor 14 contact the rotor 14, and the crests of vibration move as time goes. Therefore, a force around the shaft 8 is given to the rotor 14. Thus the rotor 14 repeatedly receives force of traveling wave in rotating direction with driving frequency $f_m$ which is inherent in the stator 4, thereby making rotary motion.

In the above-mentioned ultrasonic motor, it is necessary that oscillation frequency $f_d$ of oscillator 15 corresponds with the driving frequency $f_m$ which is determined by resonance frequency $f_{ro}$ of the stator 4. However, when environmental condition is changed, for instance ambient temperature is changed by self-heating or some change is caused by passage of time, resonance frequency $f_{ro}$ and the driving frequency $f_m$ of the stator 4 are changed, and thereby the driving frequency $f_m$ deviates from the resonance frequency $f_d$ considerably. As a result, generation efficiency of the traveling wave lowers, and driving efficiency of the motor also lowers. If worst comes to worst, the motor stops.

FIG. 8 is a circuit diagram showing the conventional driving apparatus for the ultrasonic motor, which is disclosed in Japanese unexamined published patent application Sho 63-140678. This driving apparatus is to resolve the above-mentioned object.

In FIG. 8, an ultrasonic motor 23 is shown to have electric circuit of the piezoelectric members 1 and 2. A current detection circuit 35 comprises the piezoelectric member 2, a resistor 24 connected to the piezoelectric member 2 in series, a capacitor 26 whose one end is connected to a line 20a on a connection point of the piezoelectric member 1 and 2, a resistor 25 which is connected to another end of the capacitor 26 at one end thereof and also connected to a line 19a at another end thereof together with the resistor 24, and a differential amplifier 42. The differential amplifier 42 comprises an operational amplifier 34 and resistors 30, 31, 32, and 33. The current detection circuit 35 detects current which flows in the piezoelectric member 2 in proportion to mechanical vibration.

Next, operation of the current detection circuit 35 is described hereafter. FIG. 10(a) is a circuit showing the piezoelectric element 2, and FIG. 1(b) is an equivalent circuit of FIG. 10(a). This equivalent circuit is disclosed in pages 99-102 of "ATSUDENZAIKAGAKU NO KISO (Fundamental science of piezoelectric materials)", by TAKURO IKEDA, issued by OHM Sha Japan. When the whole current flowing in the piezoelectric member 2 is defined as current $I_T$, the current $I_T$ consists of a current $I_m$ which flows in mechanical vibration part X and varies in proportion to the mechanical vibration and a current $I_c$, which flows in a capacitor $C_o$ of the piezoelectric member 2 and includes higher harmonics, as shown in FIG. 10(B). Therefore, the current $I_m$ responding to the mechanical vibration can be calculated by subtracting the current $I_c$ from the current $I_T$. In the circuit shown in FIG. 8, an electrostatic capacity of the capacitor 26 is selected equal to that of the capacitor $C_o$ (FIG. 10(b)) of the piezoelectric member 2, and a resistance of the resistor 24 is selected equal to that of the resistor 25. Then, the current $I_m$ is given as a difference made by subtracting current $I_c'$ flowing in the capacitor 26 (which is equal to the current $I_c$ flowing in the capacitance $C_o$ of the piezoelectric element 2) from the whole current $I_T$ of the piezoelectric element 2. Then, on an output terminal C of the differential amplifier 42, an output responding to the current $I_m$ appears. Thus, output signal responding to the current $I_m$ which varies in proportion to the mechanical vibration is obtained.

FIG. 11 is a graph showing output waveforms A, B and C of signals on three points A, B and C (FIG. 8), respectively. The waveforms A and B are distored by the higher harmonics, but the waveforms C (which represents the current $I_m$) has no substantial distortion. Therefore, phase of the current $I_m$, which varies in proportion to the mechanical vibration, can be compared with a waveform of voltage.

In FIG. 8, a voltage detection circuit 36 detects voltage impressed on the piezoelectric member 2. A phase difference detection circuit 37 compares output waveforms of the current detection circuit 35 and the voltage detection circuit 36, and outputs D.C. voltage responding to the detected phase difference. FIGS. 8A and 8B show internal circuits of the voltage detection circuit 36 and the phase difference detection circuit 37, respectively. The voltage detection circuit 36 comprises a reference voltage source 36a and a comparator 36b. And the phase difference detection circuit 37 comprises, as shown in FIG. 8B, a reference voltage source 37e, a comparator 37d, an integrated circuit 37a (for example TP5081AP of TOSHIBA Co., Ltd.) for phase comparing, a resistor 37b and a capacitor 37c. Further, in FIG. 8, a deviation amplifier 43 comprises an operational amplifier 40, which compares the outputs of the phase difference detection circuit 37 and of a reference voltage source 41, and resistors 38 and 39. The phase difference detection circuit 37, the deviation amplifier 43 and the reference voltage source 41 constitute a phase difference detector 50. The deviation amplifier 43 outputs voltage responding to the detected deviation voltage. A variable frequency oscillator 44 varies oscillation frequency thereof responding to the output voltage of the deviation amplifier 43, and feeds the oscillation power to the driving circuit 22. Resistors 28, 29 and a capacitor 27 are provided in order to keep balance of voltage impressed to the piezoelectric members 1 and 2.

Hereafter, details of the driving circuit shown in FIG. 8 is described. The resistors 24 and 28 are connected in series to the piezoelectric members 2 and 1, respectively, and resistances of which are equal to each other. Further, capacitances of the capacitors 26 and 27 are equal to each other, and resistances of the resistor 25 and 29 are also equal to each other. The capacitor 27 and the resistor 29 are connected in series with each other between the lines 21a and 20a. Circuitry comprising the resistor 28, 29, the piezoelectric member 1 and the capacitor 27 and circuitry which constitutes the current detection circuit 35 and comprises the resistor 24, 25, the piezoelectric member 2 and the capacitor 26 are disposed in symmetry with regard to the line 20a. By making such symmetric structure, when the voltage level impressed between the lines 21a and 20a is set equal to that between the lines 20a and 19a (but phases are different from each other), the voltage level impressed on the piezoelectric member 1 becomes equal to that on the piezoelectric member 2. Therefore, such a state as to lower efficiency, which is caused by difference between the voltage levels impressed on the piezoelectric members 1 and 2, does not take place. Consequently, stable rotation of motor can be obtained.

FIG. 9 is a graph showing frequency-admittance characteristic curve. In the above-mentioned apparatus, when oscillation frequency $f_d$ of output signal of the oscillator 44 is set to be the driving frequency $f_{m1}$ which has phase difference $\Delta P$ (corresponding to frequency difference) from mechanical resonance frequency $f_{ro1}$ of the stator 4. That is the following relation holds:

$$f_d = f_{m1} \qquad (1).$$

Even when the mechanical resonance frequency $f_{ro1}$ is deviated into $f_{ro2}$ and the driving frequency $f_{m1}$ is deviated into $f_{m2}$ by change of environmental condition for the ultrasonic motor, such as temperature change caused by self-heating or change of ambient temperature or any other change by passage of time, output oscillation frequency i.e. output frequency $f_d$ of the driving circuit 22 is controlled to $f_{m2}$, namely:

$$f_d = f_{m2} \qquad (2).$$

Thus, the output frequency $f_d$ of the driving circuit 22 always follows the mechanical resonance frequency $f_{ro}$ and the driving frequency $f_m$.

However, the above-mentioned conventional driving apparatus for ultrasonic motor has the following problem. FIG. 12 is a graph showing relations of frequency-rotation speed characteristic and frequency-phase difference characteristic. When the driving frequency $f_{m1}$ is larger than the resonance frequency, rotation speed of the ultrasonic motor is in inverse proportion to the driving frequency $f_{m1}$, whereas the phase difference (between the voltage impressed on the piezoelectric member 1 and 2 and the current flowing therethrough in proportion to the mechanical vibration) gradually decreases responding to increase of the driving frequency $f_{m1}$ in low frequency and varies only slightly in high frequency. Therefore, at a high frequency in driving frequency $f_{m1}$ (namely in low rotation speed), change of the phase difference (namely change of resonance frequency) brings great change of the rotation speed, thereby resulting in difficulty of stable and fine controlling of the motor.

OBJECT AND SUMMARY OF THE INVENTION

The object of the present invention is to offer a driving apparatus for ultrasonic motor which can precisely and stably control rotation of the motor in any driving frequency. In order to achieve the above-mentioned object, a driving apparatus for ultrasonic motor in accordance with the present invention comprises:

current detection means for detecting current which flows in a piezoelectric member in proportion to mechanical vibration of the ultrasonic motor;

current level detection means for detecting current level of output signal of the current detection means and comparing the current level with reference voltage of a reference voltage source;

a variable oscillator for variably oscillating frequency responding to output signal of the current level detection means to keep the current substantially constant; and a driving circuit for supplying driving voltage based on the oscillating frequency to the piezoelectric member.

In the above-mentioned driving apparatus for ultrasonic motor, the ultrasonic motor rotates stably with precise rotation speed at any driving frequency.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Figure 1:
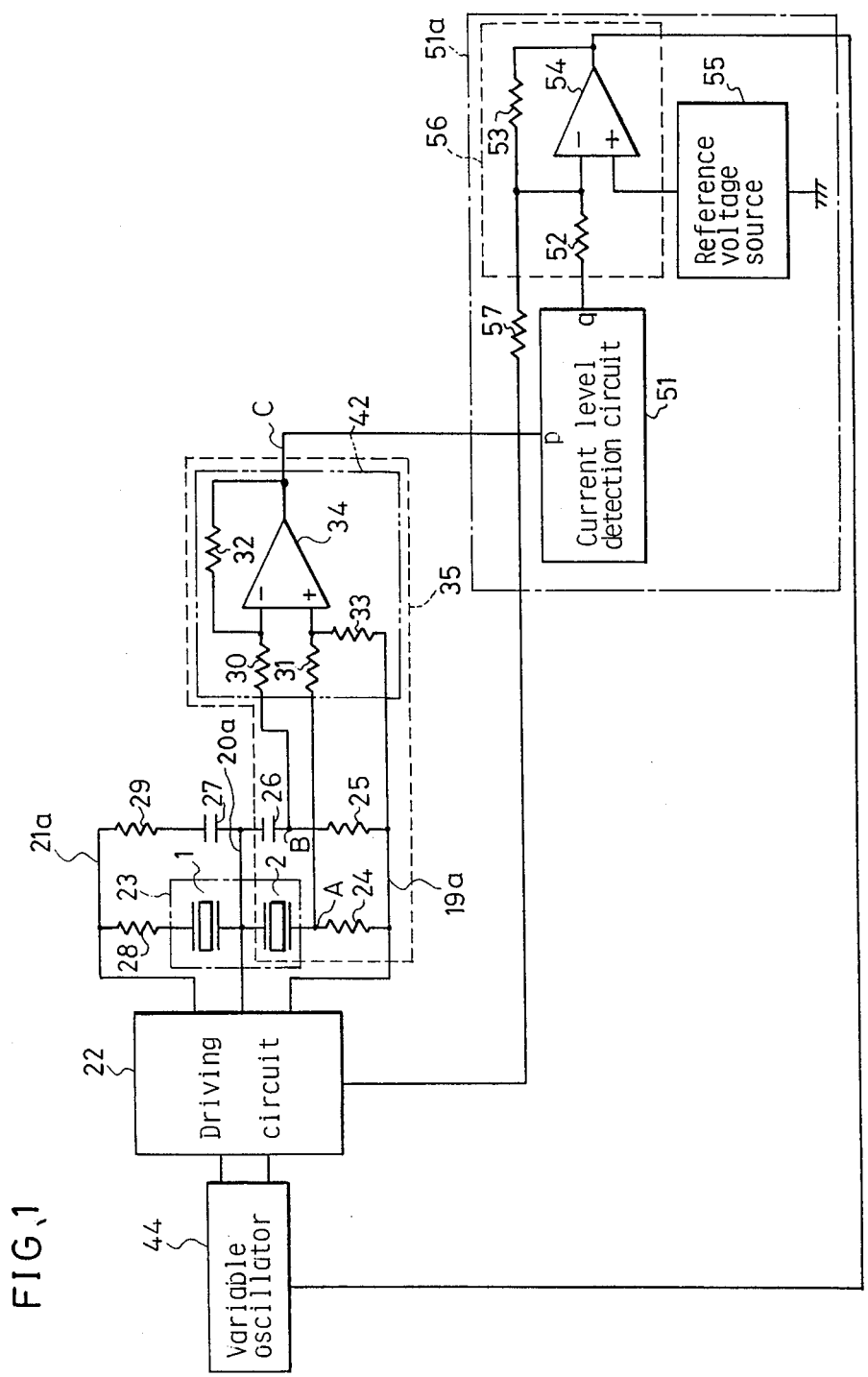
FIG. 1 is a circuit diagram showing an embodiment of the present invention.

Hereafter, preferred embodiments of the present invention are described with reference to the accompanying drawings. FIG. 1 is a circuit diagram of a driving apparatus for ultrasonic motor of a preferred embodiment. An ultrasonic motor 23 is shown to have electric circuit of the piezoelectric members 1 and 2. A current detection circuit 35 comprises the piezoelectric member 2, a resistor 24 connected to the piezoelectric member 2 in series, a capacitor 26 whose one end is connected to a line 20a on a connection point of the piezoelectric member 1 and 2, a resistor 25 which is connected to another end of the capacitor 26 at one end thereof and also connected to a line 19a at another end thereof together with the resistor 24, and a differential amplifier 42. The differential amplifier 42 comprises an operational amplifier 34 and resistors 30, 31, 32, and 33. The current detection circuit 35 detects current which flows to the piezoelectric member 2 and is in proportion to mechanical vibration thereof.

Figure 10A:
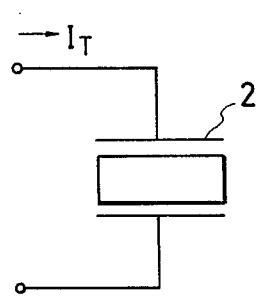
FIG. 10(a) and FIG. 10(b) are the circuit and the equivalent circuit of a piezoelectric member in the ultrasonic motor, respectively.
Figure 10B:
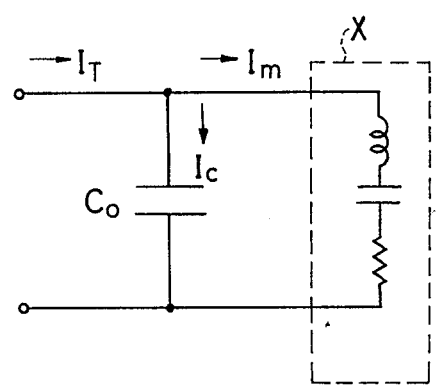

Operation of the current detection current 35 is the same as described in the prior art. An electrostatic capacity of the capacitor 26 is selected equal to that of the capacitor $C_o$ (FIG. 10(b)) of the piezoelectric member 2, and a resistance of the resistor 24 is selected equal to that of the resistor 25. Then, the current $I_m$ (FIG. 10(b)) is given as a difference made by subtracting current $I_c'$ flowing in the capacitor 26 (which is equal to the current $I_c$ flowing in the capacitance $C_o$ of the piezoelectric element 2) from the whole current $I_T$ of the piezoelectric element 2. Then, on an output terminal C of the differential amplifier 42, an output responding to the current $I_m$ appears. Thus, output signal responding to the current $I_m$ which varies in proportion to the mechanical vibration is obtained.

Figure 1A:
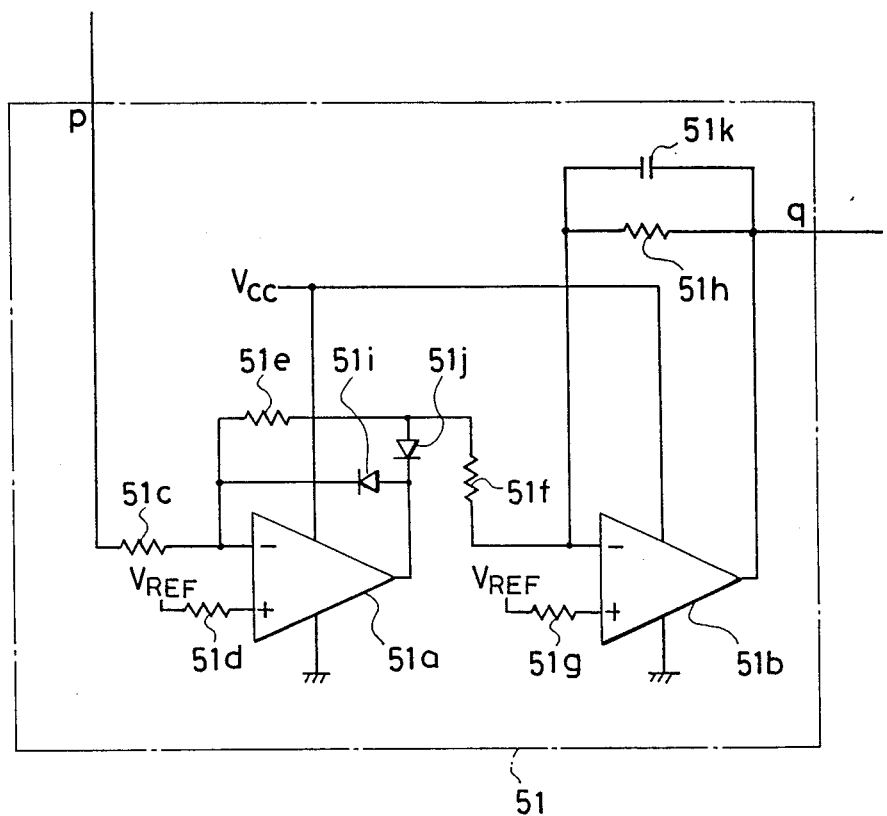
FIG. 1A is a circuit diagram showing an internal circuit of a current level detection circuit 51 in FIG. 1.
Figure 7:
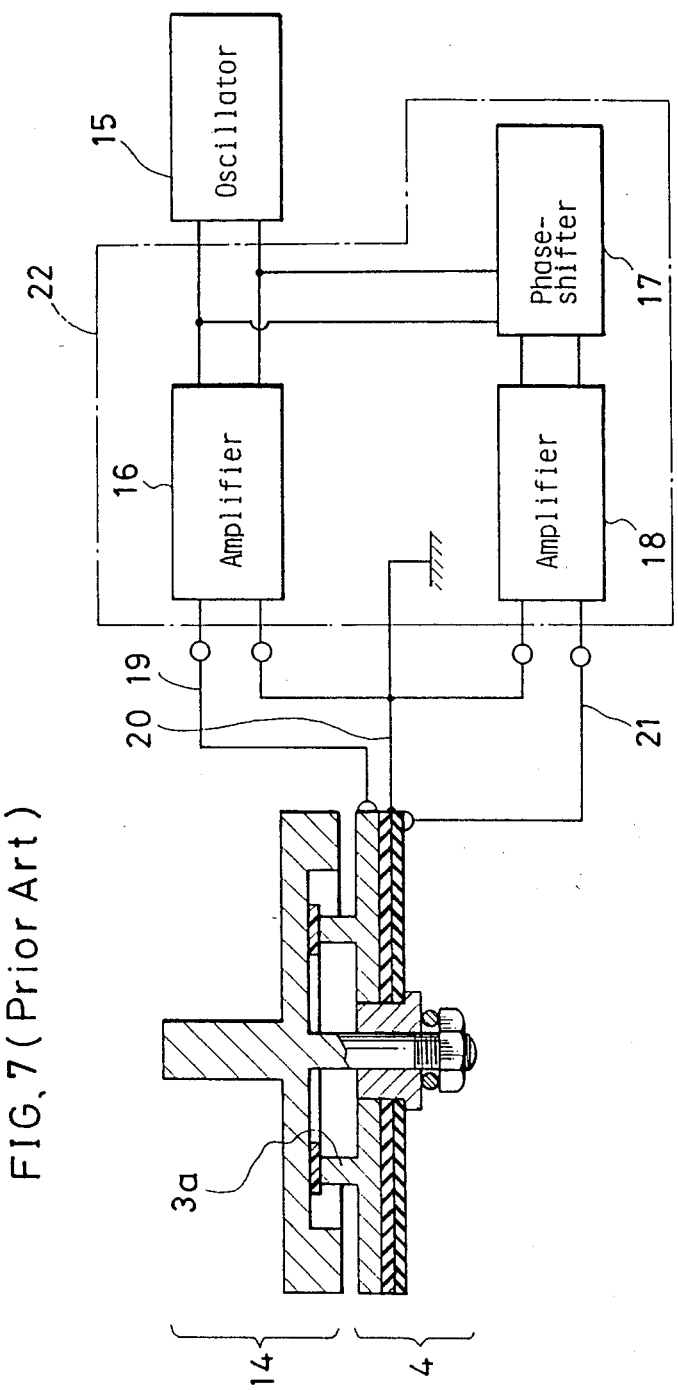
FIG. 7 is the cross-sectional view and circuit diagram showing the ultrasonic motor and the conventional driving circuit therefor, respectively.
Figure 11:
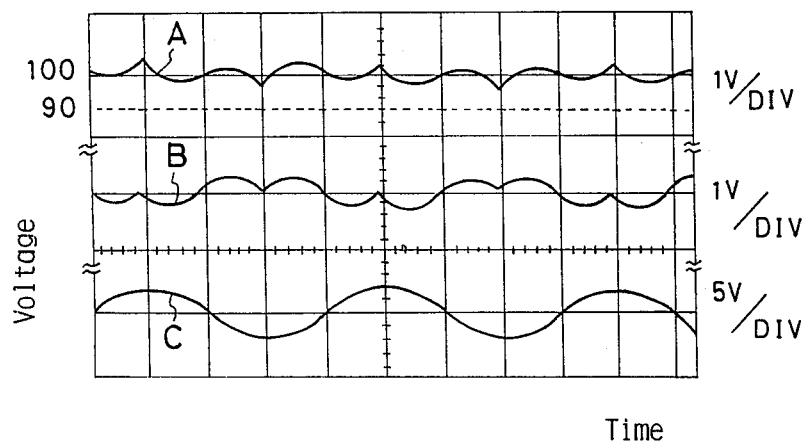
FIG. 11 is the graph showing curves of signals detected on points A, B and C in FIGS. 1, 4 and 8.
Figure 12:
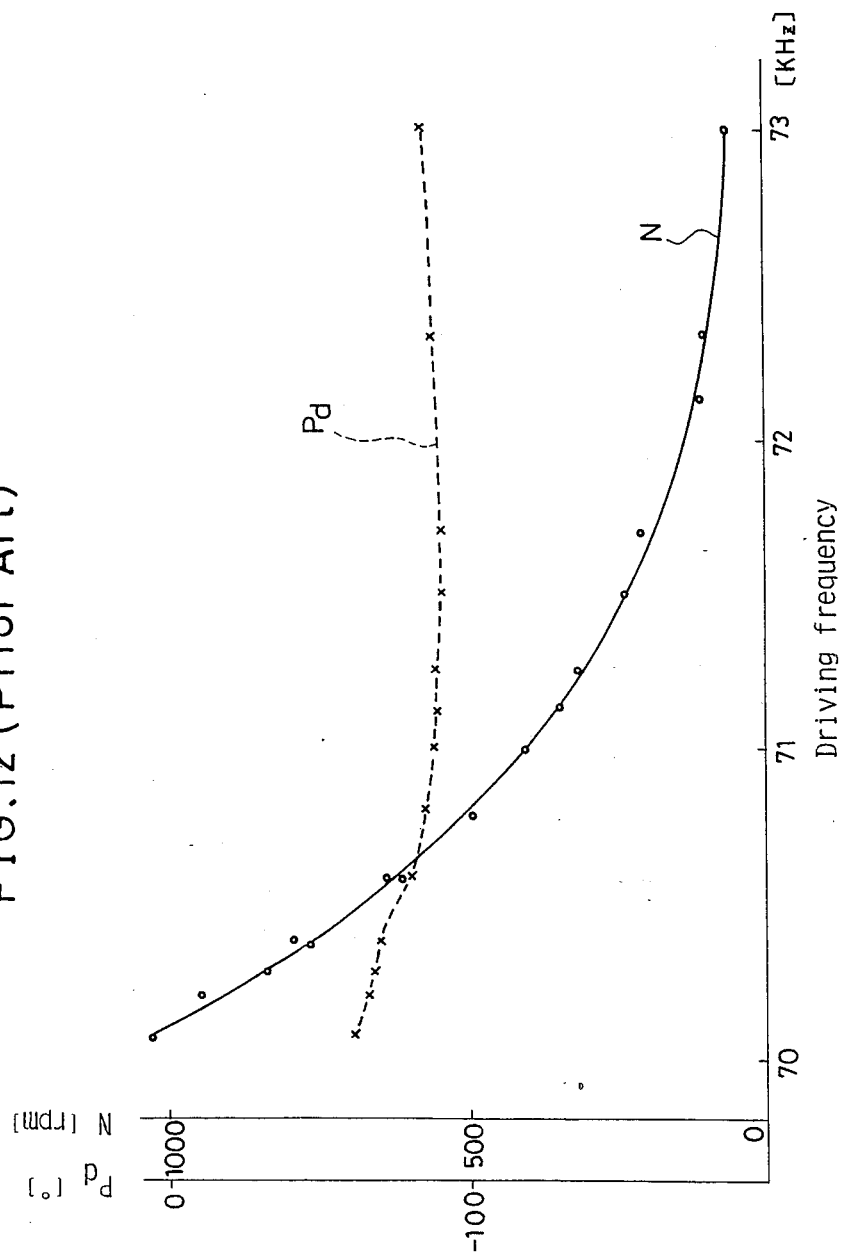
FIG. 12 is the graph showing characteristics of phase difference $P_d$ between voltage and current which is in proportion to mechanical vibration and rotation speed N versus frequency.

Output waveforms A, B and C of signals on respective three points A, B and C are shown in FIG. 11 as described in the prior art. The waveforms A and B are distored by the higher harmonics. But the waveform C (which represents the current $I_m$) has no substantial distortion. Therefore, phase of the current $I_m$, which varies in proportion to the mechanical vibration, can be compared with a waveform of voltage. Output signal of the current detection circuit 35, which is represented by the waveform C, is inputted to a current level detection circuit 51. Output signal of the current level detection circuit 51 is inputted to one of input terminals of an operational amplifier 54 through a resistor 52. This input terminal is connected to an output terminal of the operational amplifier 54 through a resistor 53. The other input terminal is connected to a reference voltage source 55. The resistors 52, 53 and the operational amplifier 54 constitutes a deviation amplifier 56. A primary terminal of a step-up transformer (not shown) which is provided in a driving circuit 22 is connected to the input terminal (−) of the operational amplifier 54 through a resistor 57. The current level detection circuit 51, the resistor 57, the reference voltage source 55 and the deviation amplifier 56 constitute a current level detection means 51a. FIG. 1A is a circuit diagram showing an internal circuit of the current level detection circuit 51. The current level detection circuit 51 comprises two integrator 51a, 51b, resistors 51c, 51d, 51e, 51f, 51g, 51h, rectifiers 51i, 51j and a capacitor 51k. The driving circuit 22 comprises amplifiers 16, 18 and 18 and a phase shifter 17 as described in the prior art with reference to FIG. 7.

Hereafter, details of the driving circuit shown in FIG. 1 is described. The resistors 24 and 28 are connected in series to the piezoelectric members 2 and 1, respectively, and resistances whereof are equal to each other. Further, capacitances of the capacitors 26 and 27 are equal to each other, and resistances of the resistor 25 and 29 are also equal to each other. The capacitor 27 and the resistor 29 are connected in series with each other between the lines 21a and 20a. Circuitry comprising the resistor 28, 29, the piezoelectric member 1 and the capacitor 27 and circuitry which constitutes the current detection circuit 35 and comprises the resistor 24, 25, the piezoelectric member 2 and the capacitor 26 are disposed in symmetry with regard to the line 20a.

The current detection circuit 35 detects the current which flows in the piezoelectric member 2 and is in proportion to the mechanical vibration, and outputs the detected current (having amplitude) to the current level detection circuit 51. In the current level detection circuit 51, the inputted current is converted into half-wave rectified current, and thereafter the half-wave rectified current is integrated and outputted therefrom. The integrated output signal of the current level detection circuit 51 is converted into voltage signal by passing through the resistor 52. The voltage signal is compared with the reference voltage of the reference voltage source 55 in the operational amplifier 54, and deviation between them is amplified and outputted. This output signal is inputted to a variable oscillator 44. Oscillation frequency of the variable oscillator 44 varies in response to the inputted signal, and is applied to the piezoelectric members 1 and 2 through the driving circuit 22, thereby keeping the current, which flows in the piezoelectric member 1 and 2 in proportion to the mechanical vibration, substantially constant, to stably control selected rotation speed of the ultrasonic motor. The reference voltage of the reference voltage source 55 is selected to be the predetermined value responding to the rotation speed desired.

Figure 2A:
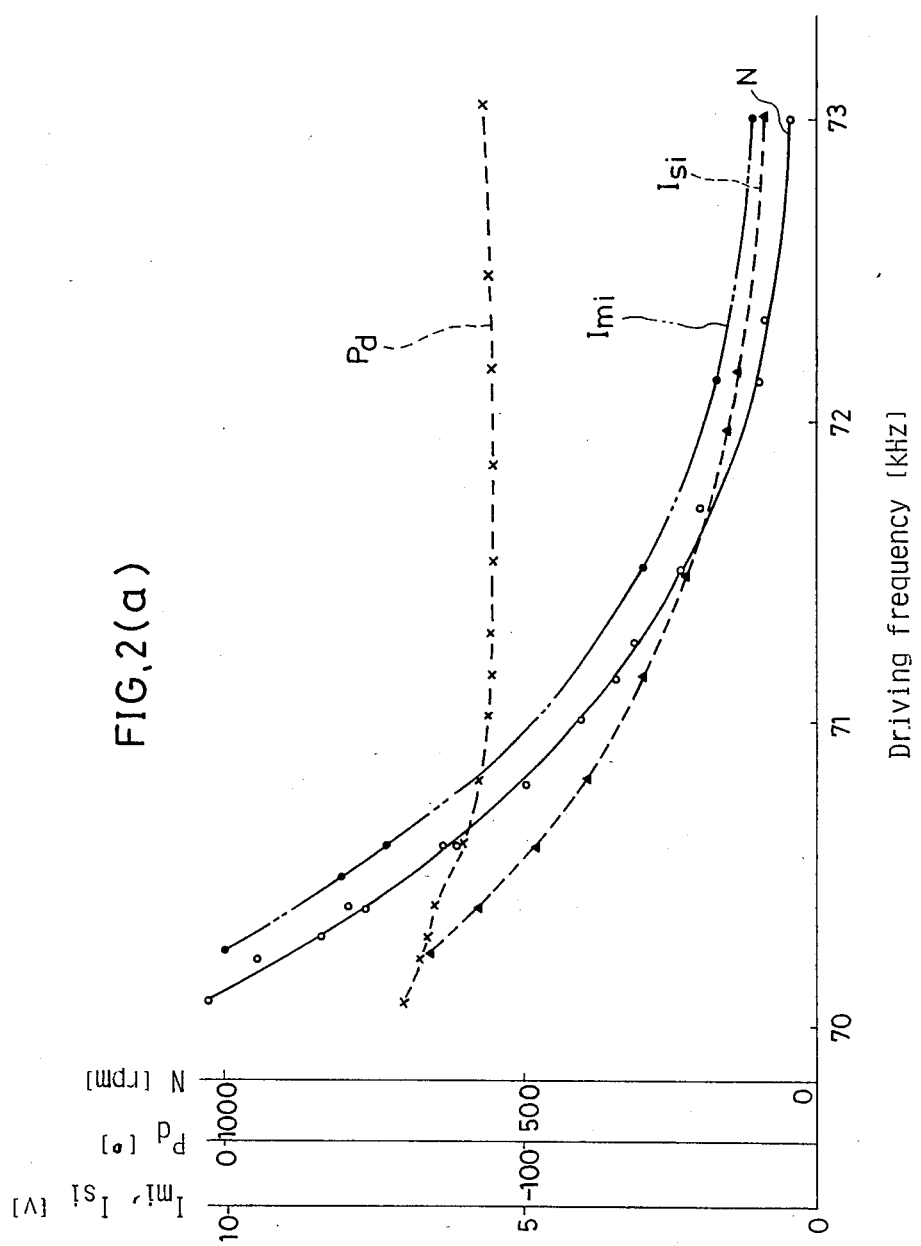
FIG. 2(a) is a graph showing characteristics of phase difference $P_d$ between voltage and current which is in proportion to mechanical vibration, integrated value $I_{mi}$ of the amplitude of the current, integrated value $I_{si}$ of amplitude using a piezoelectric sensor and rotation speed N versus driving frequency.
Figure 2B:
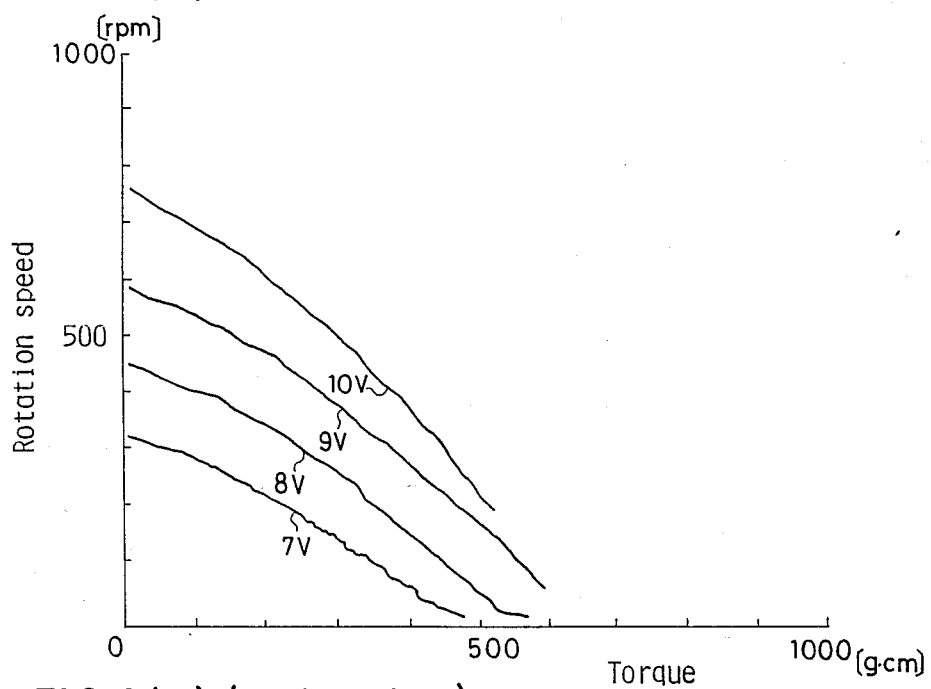
FIGS. 2(b) and 2(c) are graphs showing characteristics of rotation speed versus torque in accordance with the present invention and the prior art, respectively.
Figure 2C:
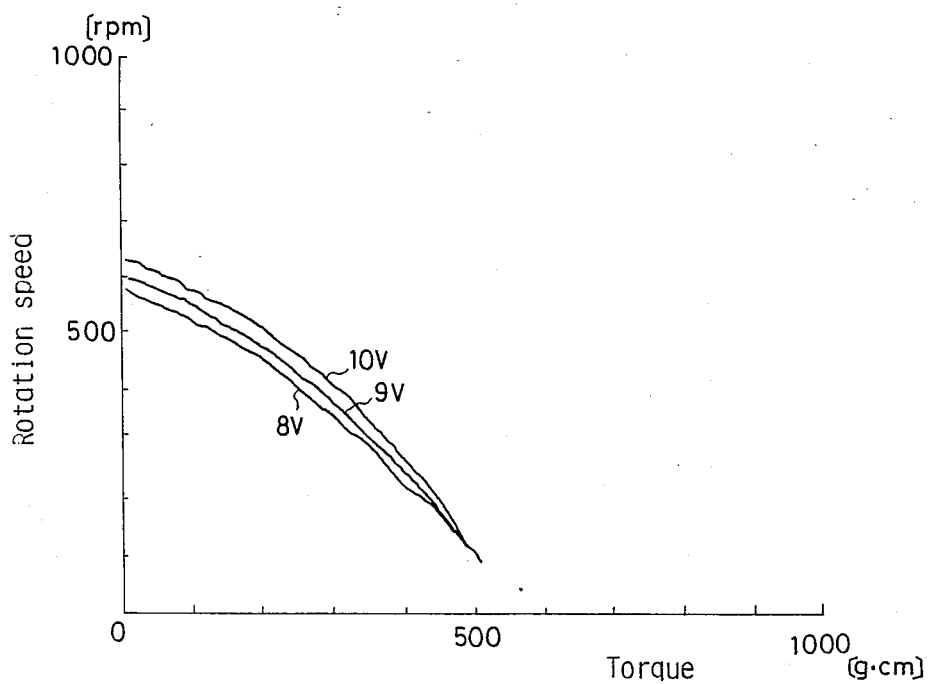

FIG. 2 is a graph showing characteristics of the several variables versus driving frequency. In the figure, a curve $I_{mi}$, which shows integrated value of amplitude of the current flowing in proportion to the mechanical vibration, gradually decreases responding to a curve N which shows rotation speed of the ultrasonic motor up to high frequency region. Therefore, in the above-mentioned embodiment, rotation speed in high driving frequency region (namely low speed) can be precisely controlled in a predetermined selected value by comparing the reference voltage of the reference voltage source 55 and the integrated value of amplitude of the current which flows in the piezoelectric member 2 in proportion to the mechanical vibration. FIG. 2(b) and FIG. 2(c) are graphs showing characteristics of rotation speed versus torque in accordance with the present embodiment and the prior art, respectively. According to the driving circuit shown in FIG. 1, the signal inputted to the step-up transformer in the driving circuit 22 is inputted to the operational amplifier 54 through the resistor 57. It becomes thereby possible to realize feedback control of the driving voltage. As shown in FIG. 2(b), according to the present invention, the characteristics of rotation speed versus torque can be changed responding to the respective driving voltage, while in the prior art as shown in FIG. 2(c) the characteristics are not changed by the change of the driving voltage. Thus, the characteristic of rotation speed versus torque can be changed by changing the voltage inputted to the transformer according to the present invention, thereby to easily satisfy many customer's specification.

Figure 3:
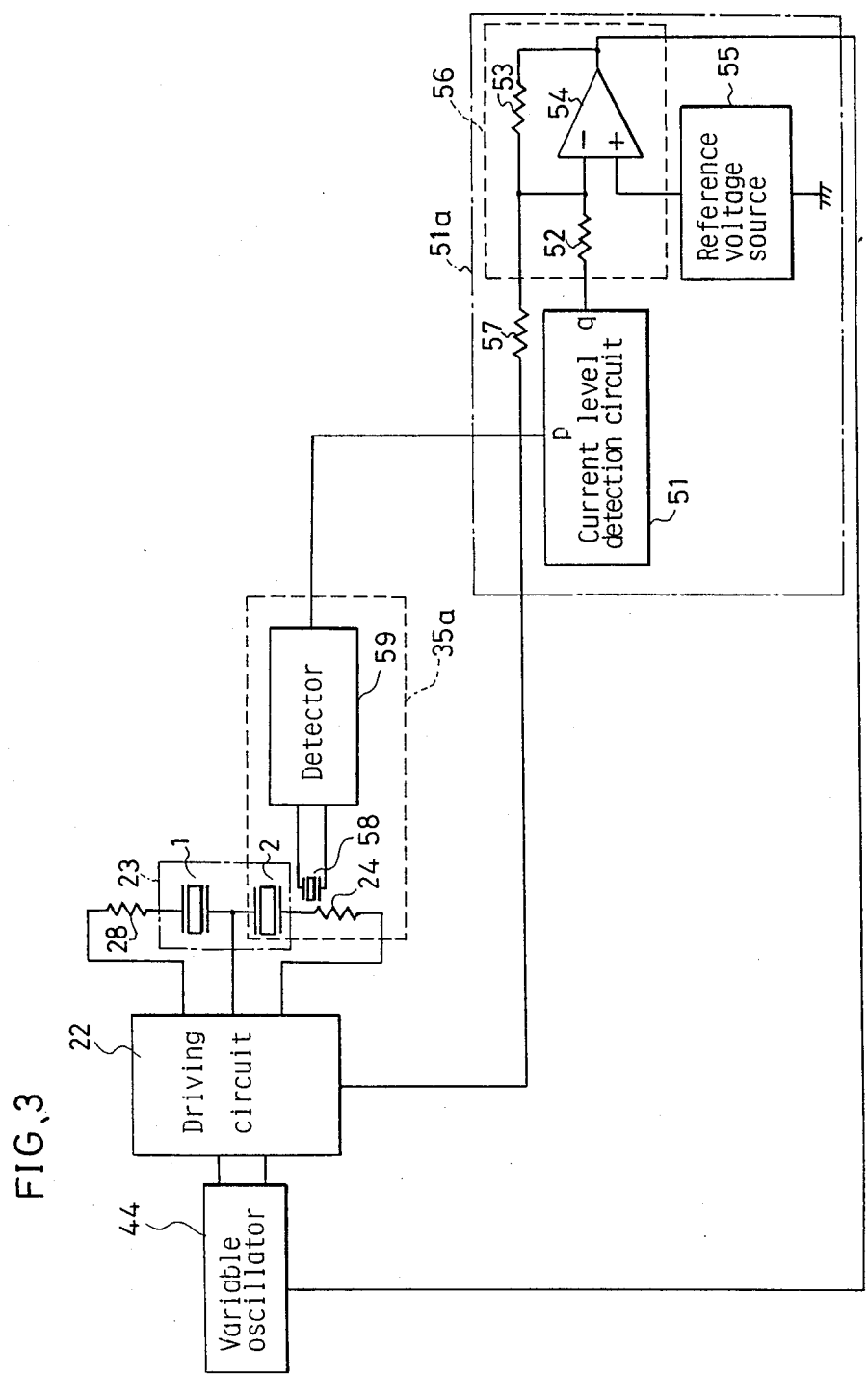
FIG. 3 is a circuit diagram showing a second embodiment of the present invention.
Figure 6:
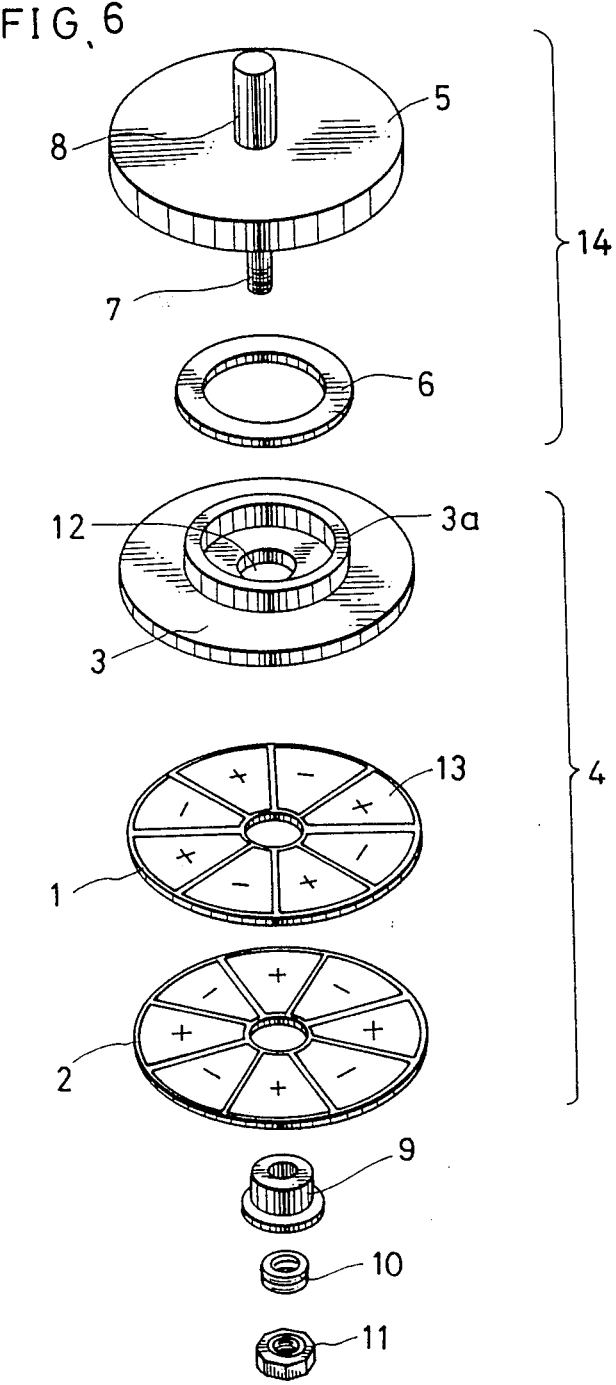
FIG. 6 is a perspective view showing general construction of the ultrasonic motor.

FIG. 3 is a circuit diagram showing a second embodiment of the present invention. Corresponding parts and components to the first embodiment are shown by the same numerals and marks, and the description thereon made in the first embodiment similarly apply. Differences and features of this second embodiment from the first embodiment are as follows. A piezoelectric sensor 58 is provided beside the piezoelectric member 2. A detector 59 receives output signal from the piezoelectric sensor 58 and detects current signal which flows in the piezoelectric member 2 in proportion to the mechanical vibration. The piezoelectric sensor 58 and the detector 59 constitute a current detection circuit 35a together with the piezoelectric member 2 and the resistor 24. In FIG. 2(a), a curve $I_{si}$, which shows integrated value of amplitude of the output signal from the piezoelectric sensor 58, also gradually decreases responding to the curve N which shows rotation speed of the ultrasonic motor up to high frequency region. The output signal from the piezoelectric sensor 58, namely current signal which flows in the piezoelectric member 2 in proportion to the mechanical vibration, is changed corresponding to mounting position (not shown) in the stator 4 (FIG. 6, 7). According to the above-mentioned construction, the capacitors 26 and 27 (FIG. 1) etc. are not required. Therefore, a larger output power than that of the first embodiment can be applied from the driving circuit 22 to the ultrasonic motor 23.

Figure 4:
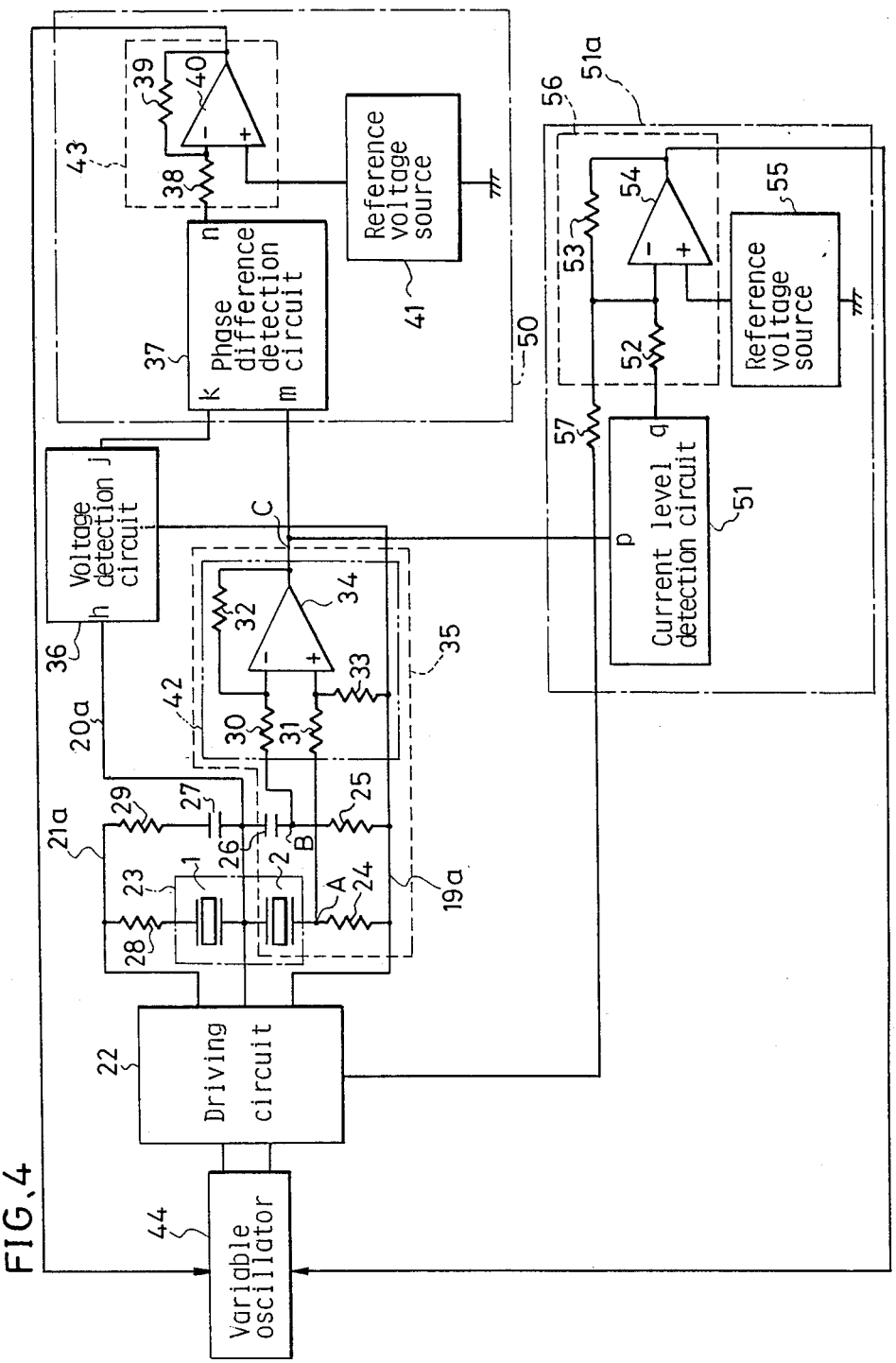
FIG. 4 is a circuit diagram showing third embodiment of the present invention.
Figure 8:
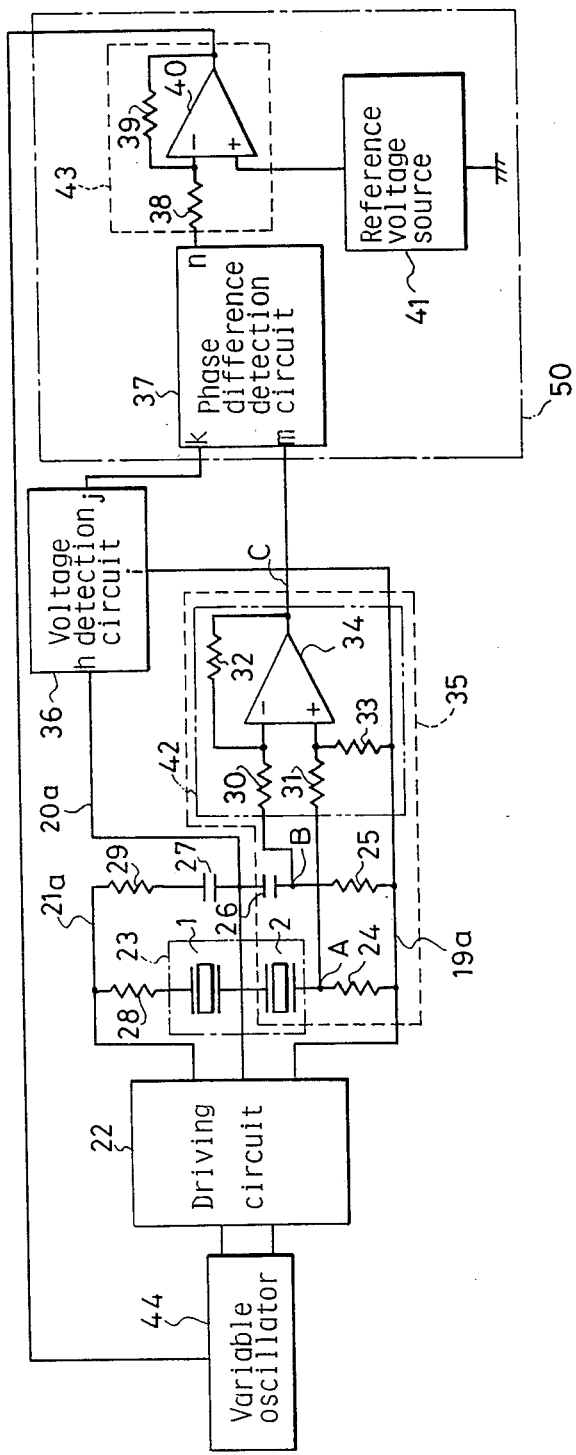
FIG. 8 is the circuit diagram showing the conventional driving apparatus for ultrasonic motor.
Figure 8A:
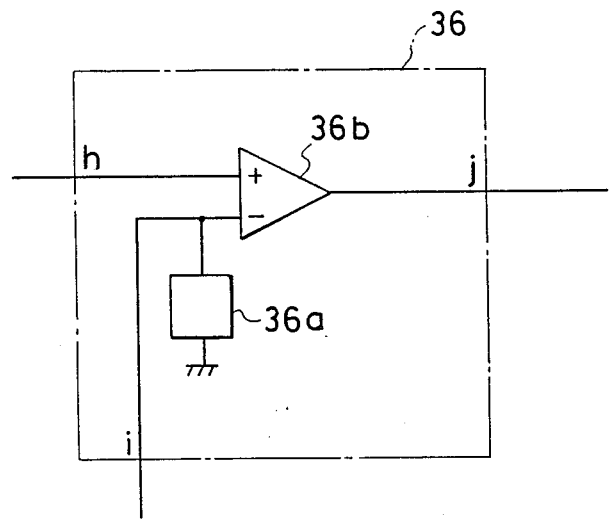
FIG. 8A is the circuit diagram showing an internal circuit of the voltage detection circuit 36 in FIGS. 4, 5 and 8.
Figure 8B:
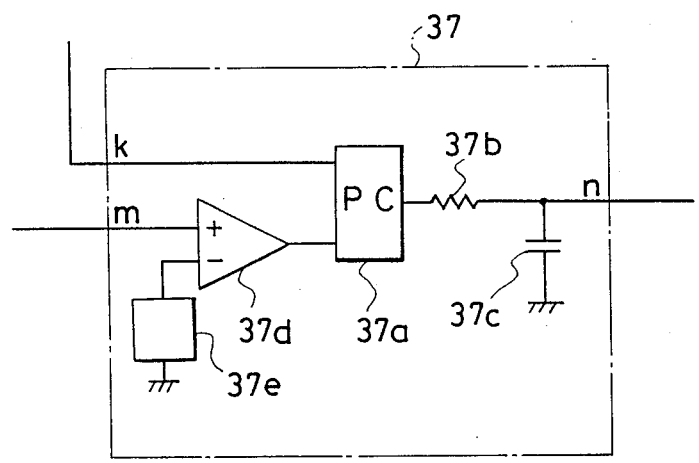
FIG. 8B is the circuit diagram showing an internal circuit of the phase difference detection circuit 37 in FIGS. 4, 5 and 8.
Figure 9:
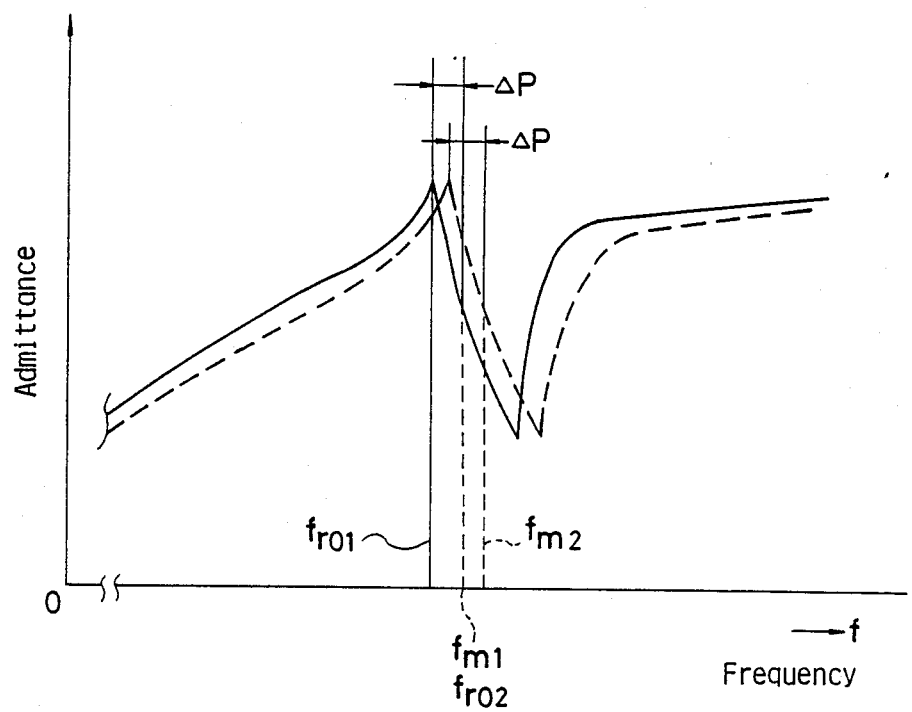
FIG. 9 is the graph showing admittance characteristic of a piezoelectric member in the ultrasonic motor versus frequency.

FIG. 4 is a circuit diagram showing a third embodiment of the present invention. Corresponding parts and components to the first embodiment are shown by the same numerals and marks, and the description thereon made in the first embodiment similarly apply. Output signal of the current detection circuit 35, which is represented by the waveform C (FIG. 11), is inputted to the current level detection circuit 51 and a phase difference detection circuit 37. A voltage detection circuit 36 detects voltage impressed on the piezoelectric member 2. The phase difference detection circuit 37 compares output waveforms of the current detection circuit 35 and the voltage detection circuit 36, and outputs D.C. voltage responding to the detected phase difference. Internal circuits of the voltage detection circuit 36 and the phase difference detection circuit 37 are also shown in FIGS. 8A and 8B, respectively. The voltage detection circuit 36 comprises a reference voltage source 36a and a comparator 36b. And the phase difference detection circuit 37 comprises a reference voltage source 37e, a comparator 37d, an integrated circuit 37a (for example TP5081AP of TOSHIBA Co., Ltd.) for phase comparing, a resistor 37b and a capacitor 37c.

Further, in FIG. 4, a deviation amplifier 43 comprises an operational amplifier 40, which compares the outputs of the phase difference detection circuit 37 and of a reference voltage source 41, and resistors 38 and 39. The phase difference detection circuit 37, the deviation amplifier 43 and the reference voltage source 41 constitute a phase difference detector 50. The deviation amplifier 43 outputs voltage responding to the detected deviation voltage. The variable frequency oscillator 44 varies oscillation frequency thereof responding to both output voltages of the deviation amplifiers 43 and 56, and the oscillating frequency is applied to the piezoelectric members 1 and 2 through the driving circuit 22, thereby keeping the phase difference and the current, which flows in the piezoelectric member 1 and 2 in proportion to the mechanical vibration, substantially constant and stably controlling selected rotation speed of the ultrasonic motor. The reference voltages of the reference voltage sources 41 and 55 are selected to be the predetermined values responding to the rotation speed desired. In the above-mentioned embodiment, rotation speed in high driving frequency region (namely low speed) can be precisely controlled in a predetermined selected value by comparing the reference voltage of the reference voltage source 55 and the integrated value of amplitude of the current which flows in the piezoelectric member 2 in proportion to the mechanical vibration. Moreover, rotation speed in low driving frequency (for instance about 70 kHz, namely high speed) can be precisely controlled in a predetermined selected value by comparing the reference voltage of the reference voltage source 41 and the phase difference $P_d$(FIG. 2(a)) between the voltage impressed on the piezoelectric member 2 and the current flowing therein in proportion to the mechanical vibration. Furthermore, the signal inputted to the step-up transformer in the driving circuit 22 is inputted to the operational amplifier 54 through the resistor 57. It becomes thereby possible to realize feedback control of the driving voltage. As shown in FIG. 2(b), the characteristic of rotation speed versus torque can be changed responding to the respective driving voltage. Thus, the characteristic of rotation speed versus torque can be changed by changing the voltage inputted to the transformer, thereby to easily satisfy many customer's specification.

Figure 5:
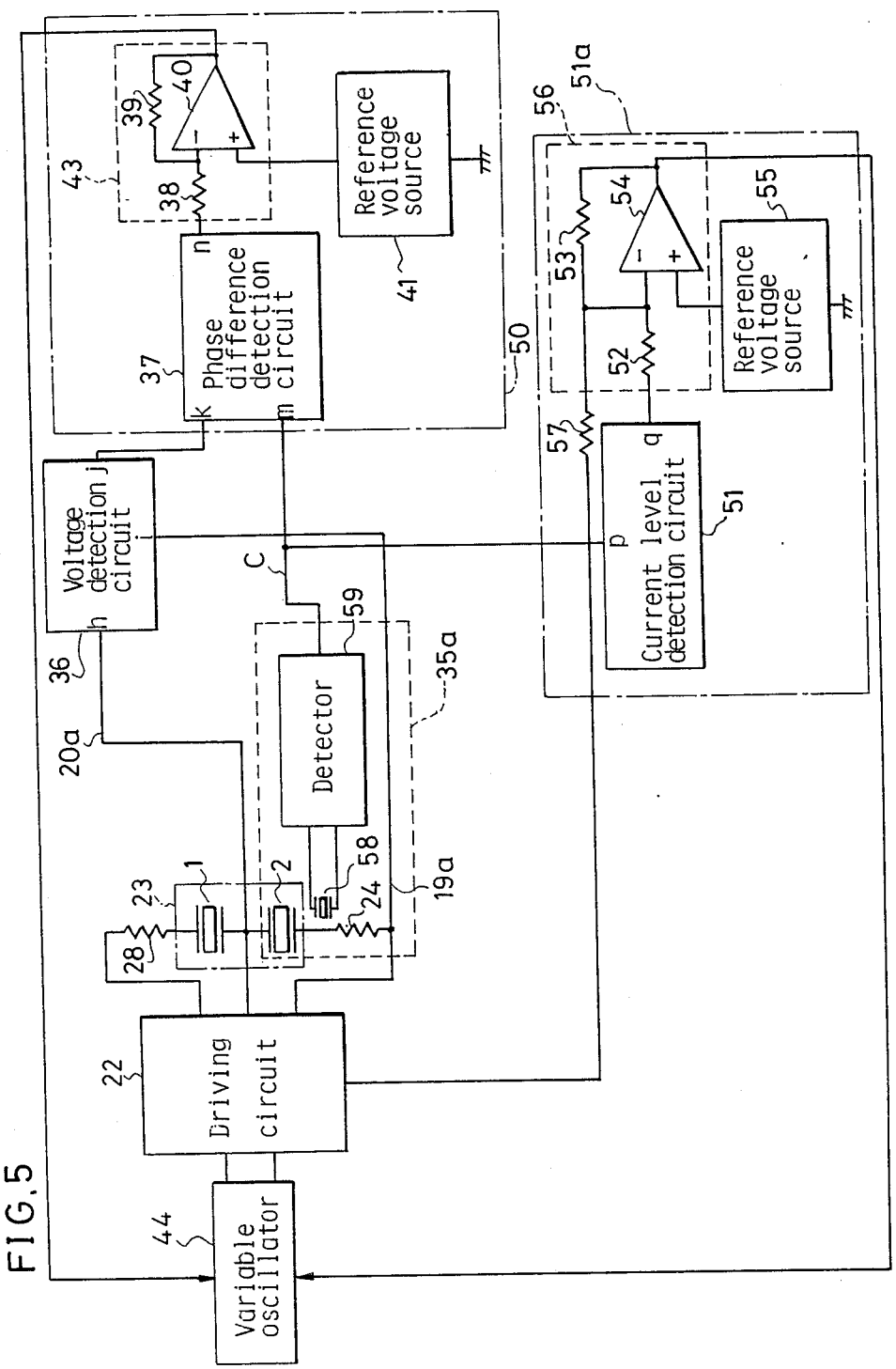
FIG. 5 is a circuit diagram showing a fourth embodiment of the present invention.

FIG. 5 is a circuit diagram showing a fourth embodiment of the present invention. Corresponding parts and components to the first embodiment are shown by the same numerals and marks, and the description thereon made in the first embodiment similarly apply. Differences and features of this fourth embodiment from the first embodiment are as follows. The driving circuit of this embodiment is obtained by replacing the current detection circuit 35 of the third embodiment (FIG. 4) with the current detection circuit 35a of the second embodiment (FIG. 3). In this embodiment, the capacitors 26 and 27 (FIG. 1) etc. are not required too. Output power, which is applied from the driving circuit 22 to the ultrasonic motor 23, is larger than that of the first embodiment.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A driving apparatus for ultrasonic motor comprising:
   current detection means for detecting current which flows in a piezoelectric member in proportion to mechanical vibration of said piezoelectric member;
   current level detection means for detecting current level of output signal of said current detection means and comparing said current level with reference voltage of a reference voltage source;
   a variable oscillator for variably oscillating frequency responding to output signal of said current level detection means to keep said current substantially constant; and
   a driving circuit for supplying driving voltage based on said oscillating frequency to said piezoelectric member.

2. A driving apparatus for ultrasonic motor in accordance with claim 1, wherein
   said current level detection means comprises:
   a current level detection circuit which is connected to said current detection means,
   a reference voltage source, and
   a deviation amplifier whose input terminals are connected to said current level detection circuit and said reference voltage source.

3. A driving apparatus for ultrasonic motor in accordance with claim 2, further comprising
   control means for variably controlling said current responding to said driving voltage.

4. A driving apparatus for ultrasonic motor in accordance with claim 3, further comprising
   a resistor for connecting said driving circuit to an input terminal of said deviation amplifier.

5. A driving apparatus for ultrasonic motor comprising:
   current detection means for detecting current which flows in a piezoelectric member in proportion to mechanical vibration of said piezoelectric member;
   voltage detection means for detecting voltage impressed on said piezoelectric member;
   phase difference detection means for detecting phase difference between output signal of said current detection means and output signal of said voltage detection means;
   current level detection means for detecting current level of said output signal of the current detection means and comparing said current level with reference voltage of a reference voltage source;
   a variable oscillator for variably oscillating frequency responding to output signals of said phase difference detection means and said current level detection means to keep said phase difference and said current substantially constant; and
   a driving circuit for supplying driving voltage based on said oscillating frequency to said piezoelectric member.

6. A driving apparatus for ultrasonic motor in accordance with claim 5, wherein
   said current level detection means comprises:
   a current level detection circuit which is connected to said current detection means,
   a reference voltage source, and
   a deviation amplifier whose input terminals are connected to said current level detection circuit and said reference voltage source.

7. A driving apparatus for ultrasonic motor in accordance with claim 6, further comprising
   control means for variably controlling said current responding to said driving voltage.

8. A driving apparatus for ultrasonic motor in accordance with claim 7, further comprising
   a resistor for connecting said driving circuit to an input terminal of said deviation amplifier.

9. A driving apparatus for ultrasonic motor in accordance with one of claims 1-8, wherein
   said current detection means comprises a piezoelectric sensor which detects mechanical vibration of said piezoelectric member.

* * * * *